Patented Aug. 11, 1953

2,648,640

UNITED STATES PATENT OFFICE 2,648,640

LACQUER COMPOSITION CONTAINING A HYDROCARBON DERIVED RESIN

Herman S. Bloch, Chicago, Ill., assignor to Universal Oil Products Company, Chicago, Ill., a corporation of Delaware No Drawing. Application December 22, 1950, Serial No. 202,439

10 Claims. (Cl. 260—13)

This invention relates to a lacquer composition useful as a protective coating composition and more specifically concerns a lacquer containing a resinous component derived from a hydrocarbon drying oil and other components which stabilize the resinous material and enhance the durability of the applied lacquer film.

One object of the invention is to produce a lacquer composition containing a resinous ingredient in combination with an oxidation inhibitor which terminates the capacity of the resin to undergo further oxidation and/or polymerization thereby preventing the formation of a brittle film when the lacquer composition is applied, dried and exposed to atmospheric conditions, and reduces the tendency of the applied film to check and peel on continued exposure of the film to atmospheric oxygen. Another object of the present invention is to provide a lacquer composition containing a resin derived from a hydrocarbon drying oil, said resin being compatible with other ingredients of the lacquer composition, soluble in common solvents, non-brittle, and resistant to aqueous and alkaline media.

In one of its embodiments the present invention concerns an improved lacquer composition comprising a resinous component, an oxidation inhibitor, and a solvent therefor capable of substantially evaporating at the ambient temperature from the surface to which the lacquer composition is applied, said resinous component comprising the product formed by oxidation of unsaturated conjunct polymers consisting of a mixture of polyolefinic, cyclic hydrocarbons containing from about 2.5 to about 4 double bonds per molecule of which from about 40 to about 70% are in conjugated relationship to each other.

A more specific embodiment of the invention relates to a lacquer composition containing from about 10 to about 50% by weight of a volatile naphtha fraction, from 0 to about 10% of a plasticizer, from about 20 to about 70% of a resin formed by oxidation of a mixture of polyolefinic, cyclic hydrocarbons containing from about 2.5 to about 4 double bonds per molecule of which from about 40 to about 70% are in conjugated relationship to each other, from 0 to about 30% by weight of an oil-modified resin and from about 0.01 to about 1% by weight of an oxidation inhibitor capable of preventing further oxidation of said resinous ingredients on continued exposure thereof to atmospheric oxygen.

Other objects and embodiments of the invention relating to the above specific components as well as alternative ingredients of the present lacquer composition and to the process for compositing the same will be referred to in greater detail in the following further description of the invention.

Lacquer compositions containing a resinous component dissolved in a suitable solvent which is capable of evaporating when applied to a surface exposed to the atmosphere, thereby depositing a uniform film of the resin over the surface on which the lacquer is applied, have been of interest as protective coating compositions because of the ease of applying such compositions. The character of the final lacquer film, its toughness, its rententivity on the surface to which the lacquer is applied, its gloss, hardness and smoothness are dependent upon the ingredients incorporated into the lacquer composition, and particularly upon the resin utilized in the preparation of the lacquer. The desirable properties for a resin intended for lacquer formation include (1) ready solubility in a volatile solvent, such as a hydrocarbon naptha fraction or a combination of a naphtha and a polar organic solvent, (2) capacity to form a continuous film upon evaporation of the solvent from the lacquer composition, (3) high gloss when deposited by evaporation of the lacquer solvent, (4) hardness and toughness, (5) resistance to oxidation and deterioration upon continued exposure to weathering elements, (6) ready availability, low cost and absence of toxicity. The lacquer compositions of are heretofore prepared utilize as one of the essential ingredients thereof a resinous material of either natural or synthetic origin but in general many of these compositions have not been entirely satisfactory because of the deficiency of one or more of the above quality characteristics in the resinous component. One of the principal faults of the resins heretofore utilized for lacquer manufacture is their sensitivity to moisture and particularly to aqueous alkali solutions, the latter when in contact with the dried lacquer film tending to cause a permanent haze and milkiness in the color of the lacquer film. This sensitivity to moisture and alkali is believed to be caused by the presence of certain organic radicals in the molecular structure of the resin, such as hydroxyl and ester radicals which inherently tend to solubilize the resin in aqueous solvents and reduce its water-repellency. The present lacquer composition contains a resin derived from a petroleum drying oil source, the resin remaining tough and elastic when deposited from the lacquer composition, even after prolonged exposure to atmospheric oxygen. It retains its hardness and toughness and remains abrasion-resistant by virtue of the action of the oxidation inhibitor which terminates the capacity of the drying oil resin to undergo continued polymerization and oxidation. The latter factors normally tend to cause embrittlement of the drying oil resin when the drying oil is initially exposed to atmospheric oxygen in the absence of the oxidation inhibitor. A particularly noteworthy property of the present hydrocarbon drying oil resin ingredient as compared with resins heretofore utilized in lacquer compositions is its enhanced ability to resist the effect of moisture and/or aqueous alkali in causing milkiness or haze in the dry lacquer film when the latter is contacted with an aqueous or alkali medium.

One of the essential components of the present lacquer is a resin prepared by partial oxidation of unsaturated conjunct polymer hydrocarbons consisting of a mixture of polyolefinic, cyclic non-aromatic hydrocarbons containing from about 2.5 to about 4 double bonds per molecule of which from about 40 to about 70% are in conjugated relationship to each other. One of the preferred sources of said conjunct polymer hydrocarbon drying oils are certain catalyst-hydrocarbon sludges formed by or during the conjunct polymerization of olefinic or isoparaffinic hydrocarbons under controlled reaction conditions. The products of the indicated conjunct polymerization reaction are recovered from the sludge by special methods of decomposing the catalyst-hydrocarbon addition complexes contained in the sludge whereby the highly unsaturated structure of the recovered hydrocarbons is preserved. The components of the mixture of conjunct polymers thus recovered from the sludge contain isolated as well as conjugated unsaturation. This characteristic of the structure of these hydrocarbons is believed to account for the ability of the product to undergo the so-called "drying" transformation on exposure of the liquid hydrocarbons as a thin film to atmospheric oxygen and their ability to form semi-solid to substantially solid resins in the advanced stages of the oxidative drying.

In the production of unsaturated conjunct polymer hydrocarbons, certain types of starting materials, generally characterized as unsaturated, non-aromatic hydrocarbons containing at least 3 carbon atoms per molecule are contacted with particular inorganic catalysts of the acid-acting type at selected reaction conditions and undergo conjunct polymerization to form a sludge-like product containing loosely bound addition compounds of the catalyst and the unsaturated hydrocarbon conjunct polymers as one of the products of the reaction. The sludge-like product is decomposed in a specific manner, as hereinafter described, to recover the desired conjunct polymer hydrocarbons therefrom, free of the acid-acting catalyst. Suitable hydrocarbon starting materials for the preparation of the sludge complex comprise, in general, hydrocarbons selected from the group consisting of mono-olefins, polyolefins and acetylenic hydrocarbons of either branched or straight chain structure containing at least 3 carbon atoms per molecule. Cyclic olefins and isoparaffins may also be utilized as starting material, either individually or in admixture with, for example, one or more mono- or polyolefins. Especially preferred charging stocks for the preparation of the catalyst sludge are olefinic mixtures separated as certain boiling range fractions from the products of a thermal cracking reaction or the liquid products of an olefin polymerization process, such as the octene fraction of a polymer gasoline product prepared by copolymerizing various butylenes and/or propylene.

The inorganic acid-acting catalysts which when contacted with the unsaturated hydrocarbon charging stocks indicated above yield the sludges containing conjunct polymer-hydrocarbons are characterized as inorganic, substantially anhydrous compounds capable of effecting polymerization and hydrogen transfer reactions between hydrocarbon reactants. The catalysts utilizable in the preparation of the unsaturated conjunct polymers include the active members of the anhydrous Friedel-Crafts metal halide group and certain inorganic acids. Thus, aluminum chloride and aluminum bromide either individually or in the presence of a promoter comprising the hydrogen halide corresponding to the halogen of the aluminum halide are capable of effecting conjunct polymerization of the unsaturated hydrocarbon charging stock. Of the inorganic mineral acids utilizable as conjunct polymerization catalysts, sulfuric acid having a concentration above about 85%, and preferably sulfuric acid containing less than about 5% water, and hydrofluoric acid containing less than 10% water constitute another group of the generally broad class of acid-acting catalysts capable of catalyzing conjunct polymerization.

Hydrofluoric acid, preferably substantially anhydrous hydrogen fluoride, is one of the preferred catalysts for the preparation of the unsaturated conjunct polymers because of the ease of recovering the acid for reuse in the process and the desirable highly unsaturated structure of the resulting conjunct polymer products.

Conjunct polymerization results on contacting the indicated hydrocarbon starting material with the acid-acting inorganic catalyst at a temperature of from about 0° to about 200° C., preferably from about 50° to about 125° C., and at a superatmospheric pressure sufficient to maintain the reactants and catalyst in substantially liquid phase. At these reaction conditions and when the hydrocarbons are mixed with the catalyst by some form of stirring device, a liquid sludge phase (comprising a complex of the catalyst with the polyenic products) and saturated hydrocarbon phase form as products of the conjunct polymerization. These phases separate into distinct layers when the reaction mixture is permitted to stand quiescent; and the layers may be separated by decantation.

The hydrocarbon conjunct polymers comprising a mixture of polyolefinic, cyclic hydrocarbons may be recovered from the sludge by means of several alternative procedures, one of the operative methods comprising hydrolysis of the sludge in an aqueous medium, for example, by mixing the sludge with water or with a dilute alkali solution. During the hydrolysis, the unsaturated conjunct polymer hydrocarbons associated with the catalyst in the sludge form a separate phase and rise to the top of the aqueous phase, while the water-soluble catalyst enters the aqueous phase. In another method of recovering the conjunct polymer hydrocarbons from the sludge intermediate product, applicable to hydrogen fluoride sludges, the latter is charged at a temperature of from about 50° C. to about 250° C. into a reactor column containing a liquid hydrocarbon diluent or into a column packed with a catalytic material which enhances the decomposition of the catalyst-hydrocarbon complexes present in the sludge, but reduces the cracking and polymerization of the conjunct polymer hydrocarbons released by decomposition of the sludge. The unsaturated conjunct polymer hydrocarbons accumulate in the bottom of the reactor with the inert diluent hydrocarbon, if utilized in the process, and may be recovered therefrom by fractional distillation of the mixture. Among the preferred catalysts for decomposing hydrogen fluoride sludges are such metals as lead, copper, and cobalt, as well as certain brasses containing copper, lead and tin. One of the preferred inert diluents utilizable in the thermal decomposition of the HF sludge are certain paraffinic naphtha fractions boiling from about 100° to about 150° C., which are readily separated from the desired hydrocarbon product by a subsequent fractional distillation. Other methods for recovering the unsaturated conjunct polymer hydrocarbons are known and may be utilized when more convenient or otherwise desirable.

The unsaturated conjunct polymers as recovered from the sludge contain a mixture of high molecular weight, cyclic, although substantially non-aromatic hydrocarbons, the individual components of which have isolated unsaturation in addition to conjugated unsaturation. Infrared examination of the hydrocarbon mixture indicates that the 4 carbon atoms which constitute the conjugated system of unsaturation are highly substituted, possessing on the average, fewer than 2 hydrogen atoms as substituents, and the cyclic portion of the molecules are cyclopentenyl in structure. The hydrocarbons boil from about 150 to over 450° C., have bromine numbers of above about 140, carbon to hydrogen ratios of from about 1.6 to about 1.7, maleic anhydride values of from about 30 to about 90, and have molecular weights of from about 250 to about 450, although a small proportion of the components have molecular weights as large as about 1000.

The oxidation of the mixture of polyolefinic, cyclic hydrocarbons or conjunct polymer hydrocarbons to form the resinous materials utilized as one of the ingredients of the present lacquer composition is effected by contacting the conjunct polymer hydrocarbons with an oxygen-containing gas such as air, a mixture of air and added oxygen, or if preferred, with pure oxygen itself, the rate of oxidation at any given temperature increasing as the proportion of oxygen in the oxidizing gas increases. The oxidation reaction is generally preceded by an induction period of from about ½ to about 2 hours during which no appreciable oxidation occurs, following which the oxidation rate increases appreciably and may continue for an additional 20 to 400 hours to yield the resin as a highly viscous liquid or as a solid suitable for incorporation in the present lacquer composition. The total length of the oxidation reaction period may, however, be reduced substantially by increasing the pressure of the oxidizing gas within the oxidation reactor, for example, to a pressure of 10 atmospheres or higher. For convenience, therefore, superatmospheric pressures are generally preferred to effect completion of the reaction as rapidly as practicable. The liquid conjunct polymer hydrocarbon phase is preferably stirred or otherwise agitated during the oxidation to increase the interfacial contact surface between the respective hydrocarbon liquid and oxidizing gas phases, thereby reducing the total conversion time. The temperature of the reaction during the oxidation is preferably maintained below about 100° C. and above about 0° C., but temperatures as low as −30° C. and as high as 200° C. are operative, although the higher temperatures generally yield products of poorer color. The preferred reaction temperature is from about 10° to about 50° C., resulting in a convenient and readily controlled rate of conversion which may be interrupted at any desired stage of completion.

The conjunct polymers in the absence of other modifying components may be oxidized by contacting the hydrocarbons with the gaseous oxidizing agent in any suitable reactor, such as a pressure autoclave, a packed vertical tubular reactor through which the hydrocarbons are allowed to flow in countercurrent relation to the gaseous oxidizing agent, or the latter may be merely bubbled into the mixture of hydrocarbons maintained in liquid phase. The preferred procedure for oxidizing the hydrocarbon conjunct polymers comprises dissolving the hydrocarbons in a solvent which is essentially inert to the oxidizing gas, such as a paraffinic hydrocarbon, a halogenated paraffin analog which remains in the liquid state at the desired temperature and pressure reaction conditions, or other inert diluent. The preferred diluents for this purpose are the relatively low molecular weight normal paraffinic hydrocarbons such as butane, pentane, hexane, etc., which may be liquefied at superatmospheric pressures and may be readily separated from the reaction product at relatively low temperatures by distillation therefrom. The diluent maintains homogeneity and reduces the viscosity of the mixture which increases as the oxidation proceeds and also maintains the semisolid or solid resin in solution until oxidation to the desired degree of completion.

The oxidation rate, and particularly the depth of reaction may be increased by incorporating a mineral acid in the hydrocarbon starting material, such acids including concentrated sulfuric acid, hydrochloric, hydrobromic, and hydrofluoric acids, which may be subsequently removed from the resinous product by extraction thereof with water or by neutralization with an aqueous alkali solution. The oxidation rate and depth of the reaction may also be increased by incorporation of a catalyst into the mixture of conjunct polymer hydrocarbons, the catalyst being selected from the general group known in the art as "driers," such as the organic carboxylic acid salts of the iron group (or Group VIII) metals of the Periodic Table, particularly the salts of cobalt, nickel, and iron including cobalt or nickel naphthenates, oleates, acetates, citrates and other well known "drier" compounds. The oxidation may also be promoted by certain metallic oxides such as lead oxide, copper oxide, tin oxide, manganese dioxide, etc. The metal salts of the fatty acids and naphthenic acids are particularly preferred because the latter are soluble in the drying oil hydrocarbon mixture and therefore are more active in promoting the oxidation of the drying oil when the oxygen containing gas is contacted therewith.

The high boiling point fractions of the mixture of unsaturated conjunct polymer hydrocarbons, particularly the fractions boiling above about 300° C. and including end boiling fractions of the conjunct polymer hydrocarbon mixture, generally boiling at about 450° C. at normal pressure, produce more desirable lacquer resins upon oxidation than the lower boiling fractions of the unsaturated conjunct polymer hydrocarbons. The resins prepared therefrom are generally less brittle after oxidation and are more readily soluble in the common lacquer solvents than the resins formed from the lower boiling fractions. For purposes of the present lacquer composition, therefore the fraction boiling above about 300° C. of the mixture of unsaturated conjunct hydrocarbon polymers is preferred as starting material for preparation of the lacquer resin via the present oxidation.

The unsaturated conjunct polymer hydrocarbons may be oxidized to a viscous, oleaginous material by interrupting the oxidation prior to completion, or the preferred form of the resinous product may be prepared by continued oxidation until a solid, generally harder resinous material is formed. The resins preferred for use as components in the present lacquer composition are the non-brittle dimolecular oxidation products formed on introduction of a limited amount of oxygen into the mixture of conjunct polymer hydrocarbons. It has been observed that on exposure of the unsaturated conjunct polymer hydrocarbons to air or oxygen, the hydrocarbon components thereof are converted to solid resins of approximately twice the molecular weight of the olefinic hydrocarbon components, but only by terminating the oxidation reaction at the stage of dimolecular condensation. The condensation reaction effected in the presence of oxygen normally terminates upon formation of the dimolecular condensation product and upon continued exposure to oxygen, degradation of the initial product occurs with eventual rupture of carbon-carbon bonds in the structure of the conjunct polymer hydrocarbons. It is noted further that when utilizing the incompletely oxidized product in a coating composition wherein the composition is spread as a thin film on a surface to be protected therewith and subsequently exposed to atmospheric oxygen, oxidation proceeds further and continues until a brittle material is formed which powders or checks and peels from the surface to which the coating composition is applied and, in addition, may assume a highly colored form, generally considered undesirable for coating compositions. It becomes desirable, therefore, when incorporating the oxidized or partially oxidized resinous, polyolefinic, cyclic hydrocarbons in a lacquer composition as the resinous component thereof to terminate the effect of atmospheric oxygen on the film at the stage in its oxidation cycle at which the dimolecular condensation product is formed, at which point the film of drying oil resin has attained its maximum toughness, elasticity and retentivity to the surface to which the lacquer is applied. It is for this purpose that the present lacquer composition also incorporates therein as one of the essential ingredients thereof, an oxidation inhibitor selected from certain organic compounds compatible with the present resinous ingredient and soluble in the organic solvents utilized to dissolve the present resin. Suitable oxidation inhibitors for this purpose include certain phenolic compounds, and particularly certain molecularly alkyl-substituted phenols of which the branched chain alkyl-substituted compounds are exceptionally effective oxidation inhibitors when incorporated into the present lacquer composition. Thus, ortho-, meta-, and para-alkyl phenols, such as the cresols, isopropylphenols, butylphenols, tert.-butylphenols, amylphenols, isoamylphenols, isopropylcresols, tert.-butylcresols, isopropyldimethylphenols; hydroxyphenols such as hydroquinone, resorcinol, pyrocatechol, alkyl-substituted hydroxyphenols, such as methylhydroquinone, methylresorcinol; dihydroxyphenols such as pyrogallol, phloroglucinol and 1,2,4-trihydroxy benzene, and their derivatives such as the partially etherified derivatives, and particularly the nuclearly substituted amino derivatives are especially effective in the present composition. The latter partial ethers and amino derivatives include such compounds as tert.-butylmethoxyphenol, ortho-, meta- and para-aminophenols, 2,4-diaminophenols and their N-alkyl and N,N-dialkyl as well as the nuclear alkyl derivatives, including N-butyl-p-aminophenol and 3-amino-4-tert.-butylphenol which illustrate the large number of organic compounds suitable as oxidation inhibitors in the present lacquer composition. Based on the quantity of resinous components in the lacquer composition, the proportion of oxidation inhibitor incorporated into the lacquer is preferably from about 0.001% to about 1% by weight, the resin in turn being present in amounts of from about 20 to about 70% by weight of the total lacquer composition. On the basis of the entire lacquer composition including solvents, etc., the proportion of oxidation inhibitor therein is from about 0.0002 to about 0.7% of the lacquer composition.

In the preparation of the present lacquer composition, the resinous and inhibitor ingredients are dissolved in a solvent or combination of solvents which maintain the composition in a free-flowing, homogeneous, clear solution at normal temperatures of use. The solvent is preferably one that does not evaporate too rapidly when the resultant lacquer is applied as a thin film to the surface of the article intended to be coated thereby eliminating the condensation of atmospheric moisture on the film as a result of the cooling effect accompanying rapid evaporation. Furthermore the solvent is preferably non-hygroscopic to the extent that water is not readily absorbed from the atmosphere when the lacquer is spread as a thin film and the film exposed to the atmosphere, thereby further precluding the development of a haze or cloudiness in a film of the composition while the lacquer dries. The choice of a suitable solvent also depends on the ultimate composition of the lacquer, that is the number and character of the resin solids and inhibitor components in the lacquer. In compositions containing only the resin prepared by oxidation of unsaturated conjunct polymer hydrocarbons (as described herein) as the sole resinous ingredient, hydrocarbon naphthas are desirable solvents, particularly a straight-run naphtha or a high solvent VM&P naphtha commonly used by paint and varnish makers in the formulation of other coating compositions. A straight-run naphtha (that is, the normally liquid but relatively low boiling point fraction distilled from a petroleum crude) boiling up to about 175° C. is suitable for dissolving the present unsaturated conjunct polymer-derived resins and may be incorporated in the composition in an amount of from about 30 to about 80%. Such solvent naphthas may have relatively high paraffinicity, although it is generally preferred to utilize high solvent naphthas containing relatively large proportions of such aromatic hydrocarbons as benzene, toluene, ortho-, meta-, and para-xylenes, naphthalene, etc. The solvent may be a naphtha derived from any of the common sources, such as a coal tar naphtha, a petroleum naphtha fraction, or a synthetic mixture of various individual hydrocarbons containing paraffinic and aromatic hydrocarbon components. Other auxiliary solvents may be admixed with the naphtha to enhance the solubility of the lacquer components, including such organic compounds as ethyl acetate, sec.-butylacetate, n-butylacetate, isobutylacetate, isobutyl alcohol, n-amylacetate, sec.-amylacetate, amyl alcohol, an alkyl Cellosolve, a polyalkylene glycol, methylisobutylketone, sec.-butyl alcohol, mesityl oxide, butylmethylketone, di-isopropylketone, methyl diacetone alcohol ether, diacetone alcohol, and others. A high solvent naphtha or a naphtha in combination with one or more of the above auxiliary solvents is preferred when utilizing a resinous product derived by the oxidation of the low boiling ends of the unsaturated conjunct polymer hydrocarbon mixture, as for example fractions boiling up to about 250° C.

Other resins, in addition to the resinous oxidized unsaturated hydrocarbon conjunct polymers may optionally be incorporated into the present lacquer composition, such resins as the coumarone-indene, vinyl alcohol ester polymers, such as a polyvinyl acetate, the ureaformaldehyde resins, the polyvinyl alcohol acetals such as the butyral resins, the phenolformaldehyde resins, the polystyrene and styrene-butadiene copolymers, rubber and chlorinated rubber, the acrylic acid ester polymers, and particularly, the oil-soluble alkyd resins such as the phthalic anhydride-glycol and polyoxyalkylene glycol condensation products are especially effective as additional resinous components, particularly when modified with saturated fatty acid glyceride oils, such as cottonseed and coconut oils. Of the preferred oil-soluble alkyds, the fatty acid-modified phthalic anhydride-glycerol, phthalic anhydride-pentaerythritol and polypentaerythritol condensation products, the rosin (abietic acid) - glycerol and polyinositol alkyds are preferred additional resins. Another type of resin which is a preferred lacquer composition ingredient because of the enhanced gloss imparted to the final dried lacquer film without material increase in viscosity of the liquid lacquer composition and because of the increased hardness and tensile strength which these resins are capable of imparting to the dried lacquer film with no decrease in flexibility of such resulting films is the class of materials known as cellulose esters typical of which are such compounds as nitrocellulose, celluloseacetate and other organic acid esters of cellulose. When incorporated into the lacquer composition, the additional resin is preferably present in amounts not greater than about 85% of the total resinous component of the lacquer, or up to about 60% of the entire lacquer composition, including solvents and other ingredients. It is to be emphasized, however, that the incorporation of the above indicated resinous ingredients in addition to the oxidized conjunct polymer hydrocarbon resin is an optional procedure and the desirability of doing so ultimately depends upon the use to which the lacquer is to be put and the conditions of the atmosphere, temperature, etc. which the lacquer film will be required to withstand.

In some instances and particularly when another resin in addition to the oxidized conjunct polymer hydrocarbon ingredient is incorporated into the lacquer composition, it is advantageous to add a plasticizer component to the lacquer composition in amounts of from 0 to about 10% of the total composition or not more than about 14% of the total quantity of resinous ingredients in the lacquer composition. A plasticizer serves the function of preventing embrittlement of the dried lacquer film when all of the solvent has evaporated therefrom following the application of the lacquer composition to the surface of the article intended to receive the coating of lacquer. A plasticizer, therefore, is particularly desirable when a resin which normally tends to be brittle in its free condition or which tends to embrittle upon exposure to atmospheric oxygen is incorporated into the lacquer composition. A plasticizer is also desirable when utilizing a resin prepared by oxidation of the relatively volatile fractions of the mixture of unsaturated conjunct polymer hydrocarbons as the principal resinous component of the lacquer, the resins prepared from the latter starting materials normally tending to embrittle more readily than the higher boiling conjunct polymer hydrocarbon fractions, particularly in the absence of an oil-modified alkyd resin incorporated into the composition therewith. In many cases, however, the oxidized conjunct polymer resin, particularly when it is prepared from a high-boiling polymer oil, serves as a plasticizer for the other resinous ingredients of the lacquer, and vice versa, so that additional plasticizers are unnecessary. A plasticizer also is generally unnecessary when preparing a lacquer composition containing an oil-modified alkyd as one of the optional additional resinous components, since the latter resins by virtue of the fatty acid glyceride oils incorporated therein tend to prevent embrittlement of the lacquer film upon drying and also tend to prevent further oxidation of the resin by atmospheric oxygen. Suitable plasticizers which may be present in amounts up to about 10% by weight of the total lacquer composition, or about 14% by weight of the resinous ingredient in the lacquer, and preferably from about 0.5 to about 2% by weight of the lacquer composition, include such organic compounds and materials as tricresyl phosphate, dibutyl phthalate, triphenyl phosphate, butylstearate, castor oil, di-(orthoxenyl) - monophenylphosphate, dibutoxyethylphthalate, butylphthalyl - butyl - glycolate, and others.

In compositing the ingredients into the present lacquer composition, one of the preferred methods of combining the various lacquer components comprises dissolving the oxidized conjunct polymer hydrocarbon resin and other resins, if utilized in the composition, in one or more of the lacquer solvents and thereafter adding to the resulting solution the plasticizer, pigments and dyes, if desired, the oxidation inhibitor and other optional ingredients. The resinous component derived by oxidation of the unsaturated conjunct polymer hydrocarbons is preferably dissolved in the naphtha solvent while the other resinous ingredients, if added to the composition, are preferably dissolved in another volatile solvent having a higher solubility for the added resin. In many instances the components are uniformly soluble in the naphtha solvent, and in such cases the ingredients may be added to naphtha, heated to a temperature at which all of the ingredients go into the solution, below the boiling point of any of the solvents utilized in the procedure, and thereafter the solution is cooled out of contact with the atmosphere. A suitable apparatus for this purpose may comprise a varnish makers kettle, preferably fitted with a stirring device to prevent discoloration of the composition when the latter is heated to effect dissolution of the ingredients.

The present invention is illustrated with respect to specific lacquer compositions, the procedures for compositing the various ingredients and the alternative components utilizable in the present lacquer compositions in the following examples which, however, are not necessarily intended to limit the scope of the invention in accordance therewith.

Example I

A mixture of polyolefinic, cyclic hydrocarbons of unsaturated conjunct polymer hydrocarbons was prepared by reacting 16.5 kg. of a mixture of mono-olefinic hydrocarbons (mixed butylene and propylene polymers containing from about 8 to about 12 carbon atoms per molecule) with 9.0 kg. liquefied hydrogen fluoride containing less than 1% by weight of water in a pressure autoclave which was rotated as the hydrogen fluoride and the olefins were mixed. The temperature was increased to approximately 90° C. and the pressure maintained at about 205 p. s. i. while the mixture was stirred for an additional 1 hour at the above conditions. Upon cooling and becoming quiescent, the reaction mixture separated into 2 phases: an upper saturated hydrocarbon layer and a lower hydrogen fluoride sludge layer consisting of a light brown mobile fluid weighing approximately 16.1 kg.

5 kg. of the above hydrogen fluoride sludge was allowed to flow into a mixture of ice and water which resulted in the liberation of an oil from the sludge and the dissolution of the hydrogen fluoride in the aqueous phase. The oil was decanted from the lower aqueous layer, washed with dilute caustic, and dried; it weighed approximately 2.17 kg. Examination of the oil and determination of its properties indicated the following:

| | |
|---|---|
| Boiling range | 160° to above 400° C. |
| Density $D_4^{20}$ | 0.863 |
| Refractive index $n_D^{20}$ | 1.4871 |
| Color, Gardner | 12–13 |
| Average molecular weight | 300 |
| Diene number | 85 |
| Bromine number | 195 |
| Double bonds per molecule (average) | 3.2 |

250 cc. of a fraction boiling from about 325° to 400° C., separated by fractional vacuum distillation of the above prepared mixture of unsaturated conjunct polymers was placed in a glass column approximately 32 mm. in diameter and 18 inches in height and a stream of air bubbled into the bottom of the column for 120 hours. The product became highly viscous until the air bubbles failed to rise through the column of oxidized conjunct polymers. A straight-run petroleum naphtha fraction having a boiling range of from about 130° to about 160° C. was added to the oxidized mixture in the proportion of about 2 volumes of naphtha per volume of oxidized conjunct polymer hydrocarbons. The viscosity of the solution was thereby reduced and the air was again led into the mixture at room temperature for an additional 20 hours at which point evaporation of a sample of the naphtha solution deposited a solid resinous residue. Analysis of the resin indicated that it contained approximately 1 mole of oxygen per mole of unsaturated conjunct polymer hydrocarbons. To 100 cc. of the naphtha solution of the resin, containing approximately 50% by weight of resin, was added 0.1 gram of tert.-butyl-p-methoxyphenol which dissolved readily in the resulting composition.

The resulting lacquer composition was applied as a thin film by means of a spray gun to a tin-plated test panel, allowed to dry and the dried film subjected to hardness and elasticity tests. In a comparative Sward hardness test, the lacquer film was as hard as a film deposited by a lacquer composition containing 30% of a naphtha solvent, 10% of n-butylacetate solvent, 40% of a modified phenol formaldehyde resin and 20% by weight of a glycerolabietic acid alkyd resin.

The test panel was allowed to age for 90 days and exposed to sunlight and atmospheric oxygen, following which the film was again tested for hardness and elasticity. The latter tests indicated that the film did not depreciate in flexibility and hardness to any detectable extent and the film adhered to the surface of the panel as tenaciously as when initially applied. A lacquer composition prepared from the oxidized unsaturated conjunct polymer fraction utilized in the above preparation, but containing no oxidation inhibitor, although it exhibited the same initial hardness and elasticity as indicated for the above lacquer when initially applied to the test panel, was brittle, checked readily and tended to peel from the surface of the test panel after the 90 day weather exposure test.

Example II

A lacquer composition was prepared by a procedure similar to that indicated in Example 1 above, except that the fraction utilized in the preparation of the resin via oxidation was the 200–300° C. fraction of the unsaturated conjunct polymer hydrocarbon mixture prepared as indicated in Example 1. Two lacquer formulations were prepared, in Composition A tricresyl phosphate was added to the lacquer composition containing the naphtha solvent, oxidation inhibitor and conjunct polymer hydrocarbon resin prepared from the 200–300° C. fraction of the hydrocarbon mixture. In Composition B the tricresyl phosphate plasticizer was omitted. Test panels were prepared from each of the compositions and hardness and flexibility determinations made on prepared test panels before and after the 90 day ageing procedure. The test panel prepared from the lacquer containing the plasticizer remains stable and continues to adhere to the surface of the test panel upon bending the panel over a mandrel, whereas the lacquer film prepared from the composition containing no plasticizer tended to crack and chip from the surface of the panel in the flexure test.

An oil-modified alkyd resin has substantially the same effect in stabilizing the dried lacquer film as the above plasticizing component in the lacquer composition, as indicated in a test in which a cottonseed oil-modified rosin-glycerol alkyd was incorporated into the lacquer composition prepared as indicated above (that is, utilizing the resin prepared from the 200–300° C. fraction of unsaturated conjunct polymer hydrocarbons), the oil-modified rosin-glycerol alkyd being incorporated into the lacquer composition to the extent of about 20% by weight of the lacquer composition containing the oxidation inhibitor, the naphtha solvent, and the oxidized conjunct polymer hydrocarbon resin. The resulting lacquer film was compared with a film prepared from the lacquer containing no oil-modified alkyd resin. The test panel from the lacquer containing the alkyd remained flexible, although hard, after the 90 day exposure test period, while the lacquer composition containing no alkyd tended to chip and peel from the test panel in the flexibility test.

*Example III*

A lacquer composition was prepared which contained 35% of an oxidized conjunct polymer oil (boiling point 325–400° C.) similar to that in Example 1, 17.5% of lacquer grade nitrocellulose, 0.1% of t-butylmethoxyphenol as an oxidation inhibitor, and the remainder a solvent comprising a mixture of butylacetate and a concentrate of aromatic hydrocarbons. This lacquer, when applied to either steel or wood, formed a hard, tough, adherent film of excellent flexibility, which was not substantially changed in its characteristics after 10 months of weathering.

I claim as my invention:

1. A lacquer composition comprising a resinous ingredient, an oxidation inhibitor capable of terminating the oxidation of said resinous ingredient when exposed to atmospheric oxygen, and a solvent for said resinous and inhibitor ingredients, said resinous ingredient comprising the product formed by oxidation of a mixture of unsaturated conjunct polymer hydrocarbons recovered from an acid-acting catalyst-hydrocarbon complex formed in the catalytic conjunct polymerization of hydrocarbons and consisting of polyolefinic, cyclic hydrocarbons boiling in the range of from about 150° to about 450° C. and having bromine numbers above about 140 and maleic anhydride values of from about 30 to about 90 and containing from about 2.5 to about 4 double bonds per molecule of which from about 40 to about 70% are in conjugated relationship to each other.

2. The lacquer composition of claim 1 further characterized in that said mixture of conjunct polymer hydrocarbons is a fraction boiling from about 300 to about 425° C.

3. The lacquer composition of claim 1 further characterized in that said composition contains from about 20 to about 70% by weight of said resinous ingredient.

4. The lacquer composition of claim 1 further characterized in that said solvent is a petroleum naphtha boiling up to about 175° C.

5. The lacquer composition of claim 1 further characterized in that said composition contains from 0 to about 10% by weight of said composition of a plasticizer ingredient.

6. The composition of claim 5 further characterized in that said plasticizer is tricresyl phosphate.

7. The lacquer composition of claim 1 further characterized in that it contains a compatible second resinous material in an amount from about 20 to about 60% of said resinous ingredient.

8. The lacquer composition of claim 7 further characterized in that said second resinous material is an oil-modified alkyd resin.

9. The composition of claim 8 further characterized in that said oil-modified alkyd is an oil-modified rosin-glycerol alkyd.

10. The lacquer composition of claim 7 further characterized in that said second resinous material is nitrocellulose.

HERMAN S. BLOCH.

References Cited in the file of this patent

UNITED STATES PATENTS

| Number | Name | Date |
|---|---|---|
| 2,523,926 | Sperberg | Sept. 26, 1950 |